United States Patent [19]
Kurozu et al.

[11] Patent Number: 5,196,663
[45] Date of Patent: Mar. 23, 1993

[54] TRANSMISSION CONTROL APPARATUS FOR AUTOMOTIVE VEHICLE

[75] Inventors: Tomotaka Kurozu; Mikio Takeuchi, both of Yokohama, Japan

[73] Assignee: Nissan Motor Co., Ltd., Yokohama, Japan

[21] Appl. No.: 536,097

[22] Filed: Jun. 11, 1990

[30] Foreign Application Priority Data

Jun. 29, 1989 [JP] Japan .................................. 1-165348

[51] Int. Cl.⁵ .............................................. B60K 23/00
[52] U.S. Cl. .................................. 200/61.91; 200/61.88
[58] Field of Search ............... 200/61.88, 61.89, 61.91; 307/9.1, 10.1

[56] References Cited

U.S. PATENT DOCUMENTS

| | | | |
|---|---|---|---|
| 3,631,946 | 1/1972 | Grosseau | 200/61.88 X |
| 4,270,414 | 6/1981 | Tellert | 200/61.88 X |
| 4,360,718 | 11/1982 | Schobinger et al. | 200/61.88 |
| 4,482,885 | 11/1984 | Mochida | 200/61.88 X |
| 4,513,276 | 4/1985 | Kubota et al. | 200/61.88 X |
| 5,022,509 | 6/1991 | Schweiger | 192/73 |

FOREIGN PATENT DOCUMENTS 61-236958 10/1986 Japan .

Primary Examiner—J. R. Scott
Attorney, Agent, or Firm—Foley & Lardner

[57] ABSTRACT

In a transmission control apparatus for an automotive vehicle having a shift lever, a controller and a transmission actuator, a shift operation detector is additionally connected between the controller and the transmission actuator to apply an actuator control signal to the transmission actuator only when the shift lever is being operated, thus preventing erroneous operation of the transmission due to external noise. The shift operation detector comprises a touch switch provided on the shift lever knob so as to be closed only when the driver grips the knob and a hold relay energized by the actuator control signal applied from the controller via the closed touch switch.

4 Claims, 5 Drawing Sheets

TRANSMISSION CONTROL APPARATUS FOR AUTOMOTIVE VEHICLE

BACKGROUND OF THE INVENTION

1. Field of the Invention

The present invention relates to a transmission control apparatus for an automotive vehicle, and more specifically to a transmission control apparatus for actuating a transmission on the basis of shift lever position signals generated by a shift lever position detector.

2. Description of the Prior Art

Conventionally, manual and automatic transmissions (speed change gears) are well known. In the manual transmission, since any appropriate gear change ratios can be selected by the driver, it is possible to obtain comfortable drive feeling. However, the clutch engage and disengage operations are troublesome for the driver. On the other hand, in the automatic transmission, since no clutch operations are required for the driver, it is possible to reduce the driver's fatigue. However, since the gear change ratios are changed in accordance with a predetermined pattern in general, there exists a problem in that it is difficult to obtain an optimum gear change ratio at all times according to every vehicle travelling condition, so that fuel consumption ratio inevitably increases.

To overcome the above-mentioned problem, recently transmissions provided with both the manual and automatic gear change functions have been widely used, by which gear change ratios can be selected manually without operating the clutch when the shift lever is set to one of fixed ranges and, and also selected automatically when set to a D (Driver) range. In the above-mentioned transmission, a transmission control apparatus for actuating a transmission on the basis of shift lever position signals generated by a shift lever position detector is often used in cooperation with a controller (microcomputer) mounted on an automotive vehicle. An example of the transmission control apparatus as described above is disclosed in Japanese Published Unexamined (Kokai) Patent Appli. No. 61-236958, as shown in FIG. 1.

In more detail, the transmission control apparatus comprises a transmission shift lever 101, a shift lever position detector 103, a controller (e.g. microcomputer) 105 and a transmission actuator (e.g. hydraulic valve) 107 to actuate a transmission 109. In FIG. 1, when the shift lever 101 is set to any one of shift lever positions, the shift lever position is detected by the shift lever position detector 103; an electric signal Sp indicative of a shift lever position is applied to the controller 105; the controller 105 discriminates the applied position signal and outputs an actuator control signal Sc representative of a selected shift lever position to the transmission actuator 107; and the transmission actuator 107 outputs a signal Sa to the transmission 109 to actuate the transmission 109 at a gear change ratio selected by the shift lever. Further, the transmission actuator 107 generates an end signal Se indicative of gear shift operation completion to the controller 105, so that the controller 105 stops outputting the actuator control signal Sc to the transmission actuator 107.

In the prior-art transmission control apparatus as described above, there exists a problem in that the transmission actuator 107 is erroneously activated, in spite of the fact that the shift lever is not operated or shifted, when external noise is superposed upon the actuator control signal Sc applied from the controller 105 to the transmission actuator 107.

SUMMARY OF INVENTION

With these problems in mind, therefore, it is the primary object of the present invention to provide a transmission control apparatus for an automotive vehicle which can control the transmission without being subjected to the influence of external noise superposed upon actuator control signals.

To achieve the above-mentioned object, the transmission control apparatus for an automotive vehicle, according to the present invention, comprises: (a) shift lever means for selecting any one of transmission gear change positions; (b) position detecting means associated with said shift lever means, for detecting a selected transmission gear change position signal; (c) control means responsive to said position detecting means, for generating a transmission actuating control signal on the basis of the selected transmission gear change position signal; (d) transmission actuating means responsive to said control means, for actuating the transmission on the basis of the generated transmission actuating control signal; and (e) shift operation detecting means associated with said shift lever means and connected between said control means and said actuating means, for applying the transmission actuating control signal generated by said control means to said actuating means only when said shift lever means are being operated. The shift operation detecting means comprises: (a) an operation switch mounted on said shift lever means so as to be closed only when said shift lever means is being operated, said operation switch being connected to said control means; and (b) a hold relay having a relay coil connected to said control means via said operation switch and a relay contact connected between said control means and said transmission actuating means, said relay contact being closed to apply the transmission actuating control signal to said transmission actuating means, when said relay coil is energized by the same transmission actuating control signal applyed through said operation switch. The hold relay contact is kept closed by energizing the hold relay coil by the transmission actuating control signal passed through said hold relay contact itself, even after said operation switch has been opened. The hold relay contact is opened when the control means stops outputting the transmission actuating control signal to said transmission actuating means in response to an end signal indicative of gear shift operation completion. Further, the operation switch is at least one touch switch provided on a shift lever knob of the shift lever means.

In the transmission control apparatus according to the present invention, since the shift operation detecting means is further connected between the control means and the transmission actuating means in order to apply an actuator control signal to the transmission actuator only when the shift lever is being operated, it is possible to prevent the transmission from being actuated erroneously due to external noise superposed upon the actuating control signal when the shift lever is not being shifted.

BRIEF DESCRIPTION OF THE DRAWINGS

FIG. 5(B)-1 is an enlarged view showing a single shift lever position switch encircled in FIG. 5(B);

DETAILED DESCRIPTION OF THE PREFERRED EMBODIMENTS

Embodiments of the transmission control apparatus for an automotive vehicle according to the present invention will be described in detail hereinbelow with reference to the attached drawings.

Figure 2:
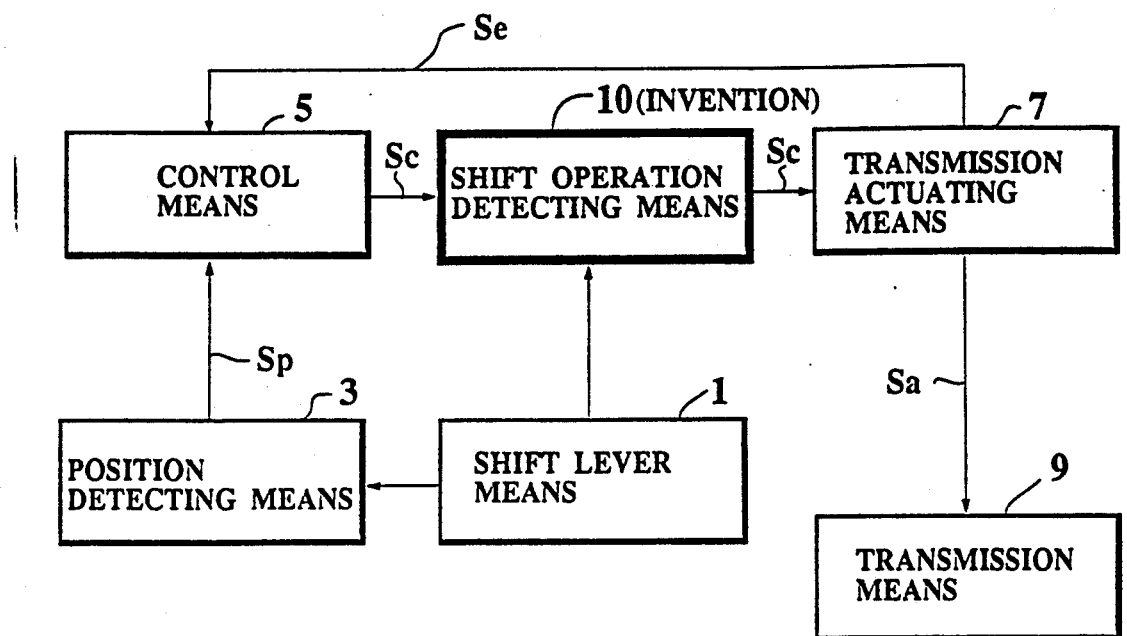
FIG. 2 is a basic block diagram showing a basic concept according to the present invention.

FIG. 2 shows a basic conceptual diagram of the transmission control apparatus of the present invention. The feature of the present invention is to connect shift operation detecting means 10 between control means 5 and transmission actuating means 7 so as to be associated with shift lever means 1. In more detail, the transmission control apparatus comprises shift lever means 1 for selecting any one of plural transmission gear change positions; position detecting means 3 associated with the shift lever means 1, for detecting a transmission gear change position selected by the shift lever means 1 and generating a shift lever position signal Sp; control means 5 for receiving the shift lever position signal Sp and generating a transmission actuating control signal Sc in response to the shift lever position signal Sp; shift operation detecting means 10 associated with the shift lever means 1 for applying a transmission actuating control signal Sc from the controller 5 to transmission actuating means 7 only when the shift lever means 1 is being operated; transmission actuating means 7 for actuating transmission means 9 in response to the transmission actuating control signal Sc and generating an end signal Se to the control means 5 after the transmission has been actuated in response to the transmission actuating control signal Sc; and transmission means 9 actuated by the actuating means 7 on the basis of the actuating signal Sa.

Figure 3:
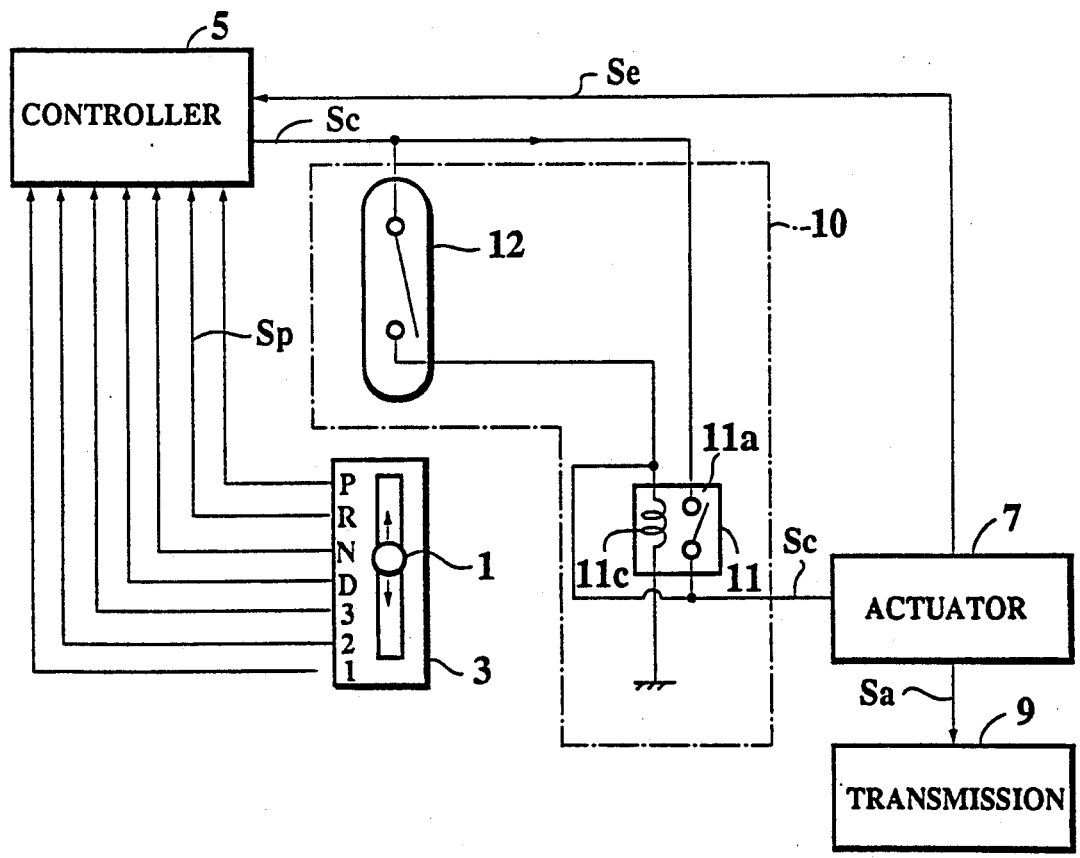
FIG. 3 is a schematic block diagram showing an embodiment of the transmission control apparatus according to the present invention.

FIG. 3 shows a practical embodiment of the shift operation detecting means 10 which comprises a shift operation detecting switch 12 closed only when the shift lever 1 is being operated or shifted and a hold relay 11 having a relay contact 11a and a relay coil 11c for closing the relay contact 11a when energized. This shift operation detecting switch 12 is a touch switch, for instance provided on a grip ball attached to an upper end of the shift lever 1 so as to be closed only when the driver grips the grip ball of the transmission shift lever.

Figure 4:
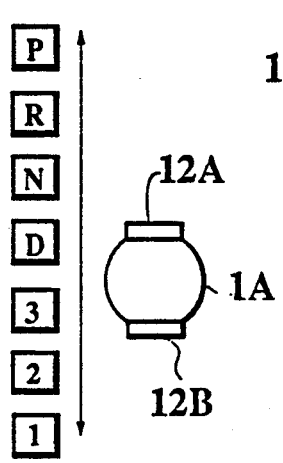
FIG. 4(A) is a diagrammatical illustration for assistance in explaining a first embodiment of a shift lever and shift lever positions.
FIG. 4(B) is a diagrammatical illustration for assistance in explaining a second embodiment of a shift lever and shift lever positions.
Figure 4:
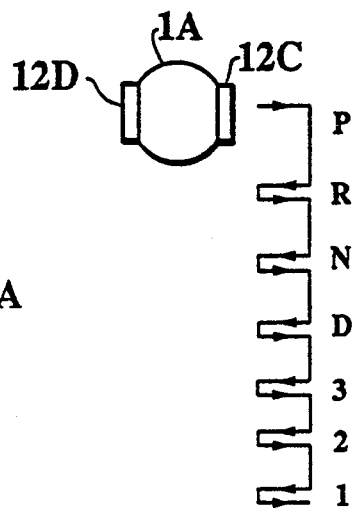

FIG. 4(A) shows a first embodiment of a shift lever knob 1A of the shift lever 1 and the shift lever positions. This shift lever knob 1A is provided with a pair of touch switches 12A and 12B arranged in the shift direction and connected in parallel to each other. Either or both of these two switches 12A and 12B are closed whenever the driver grips the knob 1A and moves it along a shift lever groove (not shown) formed in a shift lever guide plate (not shown). In FIG. 4(A), the gear shift positions are seven positions of P (Parking) position, R (Reverse) position, N (Neutral) position, D (Drive) position, 3 (Third) position, 2 (Second) position, and 1 (First) position. In this first embodiment, the shift lever 1 comprises a movable shift lever contact 1a, and the shift lever position detector 3 comprises seven terminals of P terminal TP, R terminal TR, N terminal TN, D, terminal TD, 3 terminal T3, 2 terminal T2 and 1 terminal T1. Therefore, when the shift lever 1 is shifted, the shift lever contact 1a is selectively brought into contact with any one of these seven terminals TP to T1. When six resistors R1 to R6 are connected between two of these seven terminals and a voltage V is applied between the two terminals TP and T1, it is possible to detect seven different voltage signals Sp indicative of shift lever positions according to the selected position of the movable shift lever contact 1a of the shift lever 1.

Figure 1:
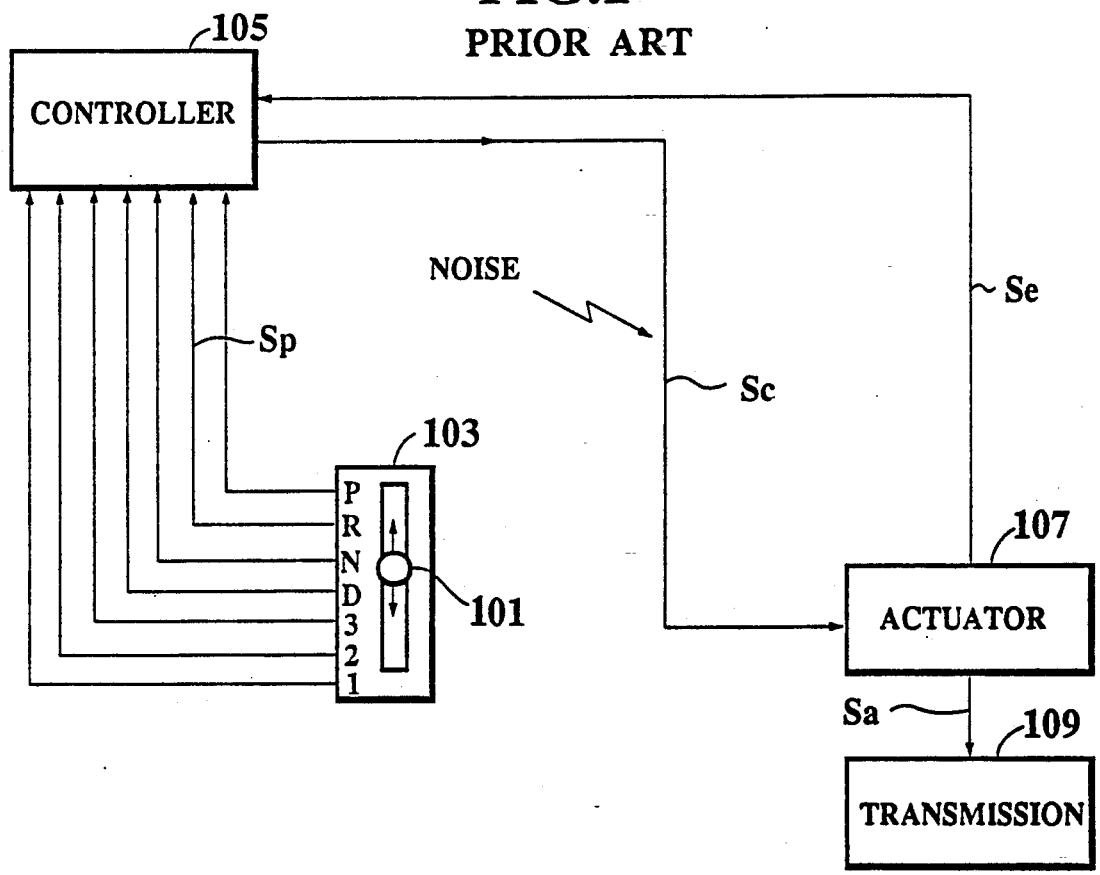
FIG. 1 is a schematic block diagram showing a prior-art transmission control apparatus for an automotive vehicle.
Figure 5:
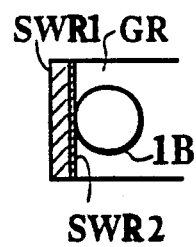
FIG. 5(A) is a diagrammatical illustration for assistance in explaining a first embodiment of shift lever position switches, which are incorporated with the shift lever shown in FIG. 4(A)
FIG. 5(B) is a diagrammatical illustration for assistance in explaining a second embodiment of shift lever position switches, which are incorporated with the lever shown in FIG. 4(B)
Figure 5:
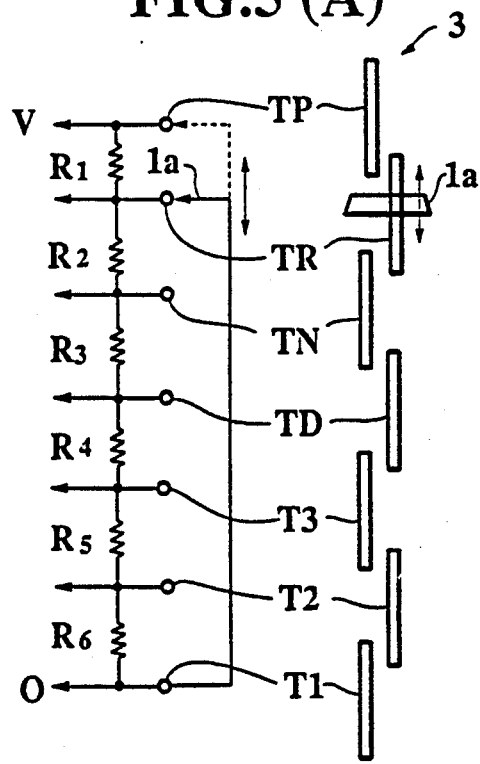
Figure 5:
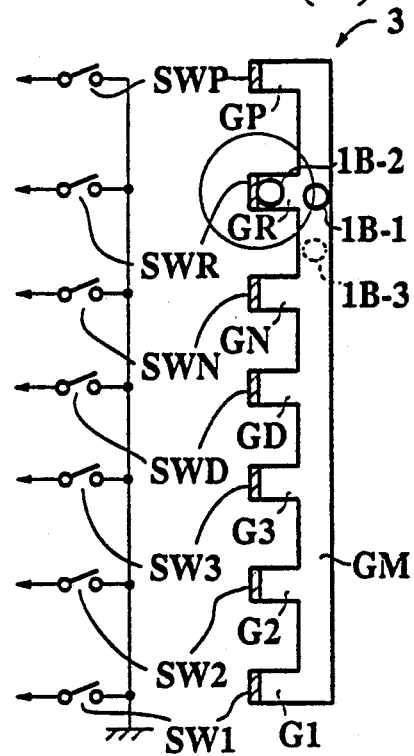

FIG. 4(B) shows a second embodiment of the shift lever knob 1A of the shift lever 1 and the shift lever positions. This shift lever knob 1A is provided with a pair of touch switches 12C and 12D arranged in the direction perpendicular to the shift direction and connected in parallel to each other. Similarly, either or both of these two switches 12C and 12D are closed whenever the driver grips the knob 1A and moves it along a main groove GM and seven subgrooves GP, GR, GN, GD, G3, G2 and G1 all formed in a shift lever guide plate (not shown). Similarly, the gear shift positions are seven positions of P, R, N, D, 3, 2 and 1. In this second embodiment, the shift lever position detector 3 comprises seven switches of P switch SWP, R switch SWR, N switch SWN, D switch SWD, 3 switch SW3, 2 switch SW2 and 1 switch SW1. A shift lever rod 1B of the shift lever 1 is urged in the leftward direction by a spring (not shown) in FIG. 5(B). Therefore, when the shift lever rod 1B is moved in the rightward direction in FIG. 5(B) against the spring along the subgroove GP, for instance, next along the main groove GM to a position 1B-1, and then released or further moved along the subgroove GR to a position 1B-2 for instance, the shift lever rod 1B closes the R switch SWR composed of a first contact SWR1 and a second contact SWR2 as shown in FIG. 5(B)-1. Further, when the shift lever rod 1B is at a position 1B-3, the transmission gear ratio at the R position is maintained. Therefore, when the shift lever 1 is shifted, the shift lever rod 1B is selectively brought into contact with any one of these seven switches SWP to SW1. When any one of these switches is closed, the controller 5 discriminates the shift lever position on the basis of voltage change, current change, frequency change, etc.

When any one of these seven switches SWP to SW1 is closed, the controller 5 discriminates the shift lever position on the basis of the transmission lever position signal Sp generated from the shift lever position detector 3 and outputs a transmission actuating control signal Sc according to the shift lever position to the shift operation detector 10.

In this embodiment, only when the shift operation detecting switch 12 is kept closed, since the transmission actuating control signal Sc energizes the hold relay coil 11c of the hold relay 11, the relay contact 11a is closed, so that the transmission actuating control signal Sc can be applied to the transmission actuator 7. Further, in this embodiment, when the relay contact 11a is once closed, since part of the current of the transmission actuating control signal Sc keeps energizing the hold relay coil 11c, even if the shift operation detecting switch 12 is opened, it is possible to keep the transmission actuating control signal Sc passing through the hold relay 11 until the gear shift operation has been completed.

The actuator 7 actuates the transmission 9 on the basis of the transmission actuating control signal Sc. Thereafter, the transmission actuator 7 generates a shift operation end signal Se to the controller 5.

The operation of the transmission control apparatus according to the present invention will be described hereinbelow with reference to FIGS. 6(A), 6(B) and 7.

When the driver grips the shift lever knob 1A of the shift lever 1 to change the shift lever position, the shift operation detecting switch 12 is first closed. Further, when the shift lever 1 is shifted to a selected position, the shifted position is detected by a shift position detector 3, that is, by the movable shift lever contact 1a and one of the shift position terminals TP to T1 or one of the shift position switches SWP to SW1. In response to the shift position signal Sp from the shift position detector 3, the controller 5 discriminates the shift lever position, and generates a transmission actuating control signal Sc. In this case, since the shift operation detecting switch 12 is kept closed as shown in FIG. 6(A), the hold relay 11 is energized to close the hold relay contact 11a, so that the transmission actuating control signal Sc is applied to the transmission actuator 7 to actuate the transmission 9.

Figure 6:
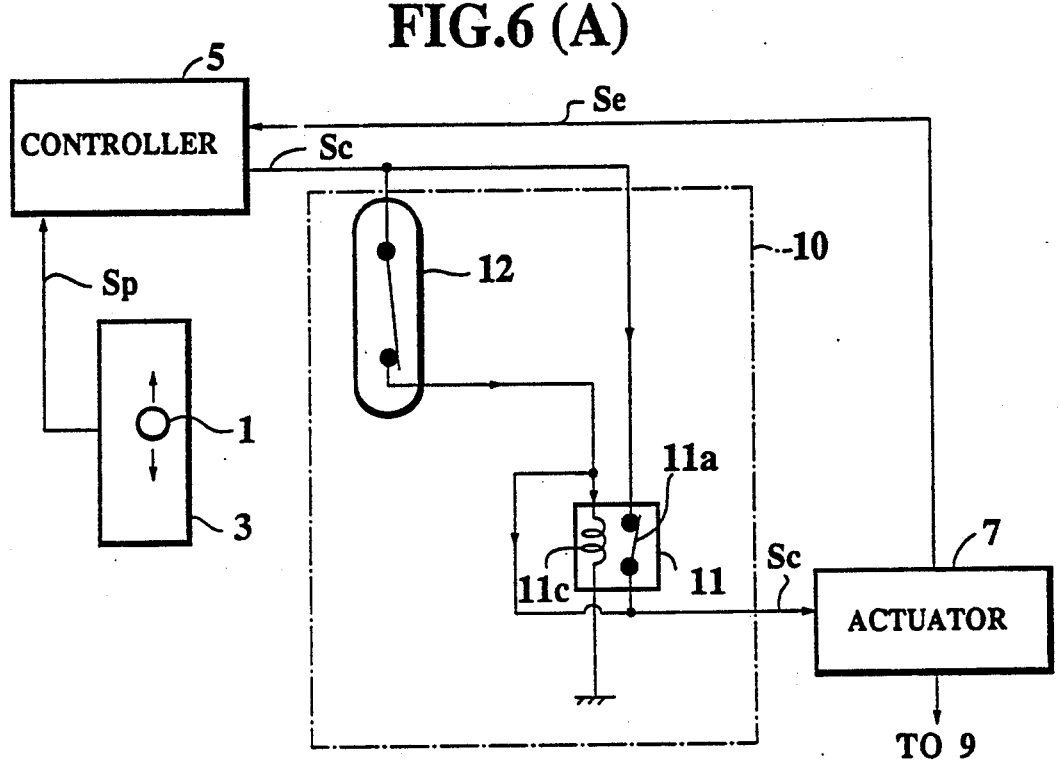
FIG. 6(A) is a schematic block diagram similar to FIG. 3, for assistance in explaining the ordinary operation of the control apparatus when the operation switch is kept closed.
FIG. 6(B) is a schematic block diagram similar to FIG. 3, for assistance in explaining the operation of the control apparatus when the operation switch is released open.
Figure 6:
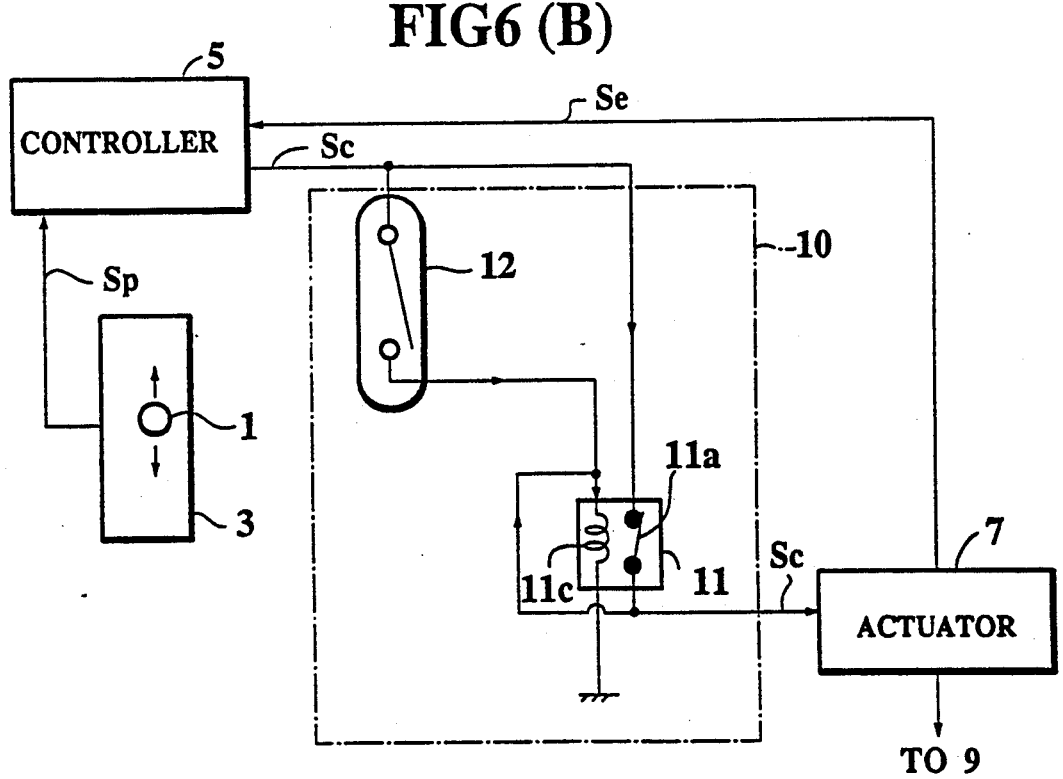

During the gear shift operation, even if the driver released the shift lever knob 1A of the shift lever 1 immediately after the shift lever 1 has been shifted to a desired shift position and therefore the shift operation detecting switch 12 is opened as shown in FIG. 6(B), since part of current of the transmission actuating control signal Sc keeps the hold relay coil 11c energized, the control signal Sc is kept applied to the transmission actuator 7 as shown in FIG. 6(B). When the transmission actuator 7 actuates the transmission 9 and therefore the gear shift operation has been completed, since the transmission actuator 7 outputs an end signal Se to the controller 5, the controller 5 stops outputting the transmission actuating control signal Sc to the shift operation detector 10, so that the hold relay 11 is deenergized to the initial conditions where the shift operation detecting switch 12 and the hold relay 11 are both released open as shown in FIG. 7.

Figure 7:
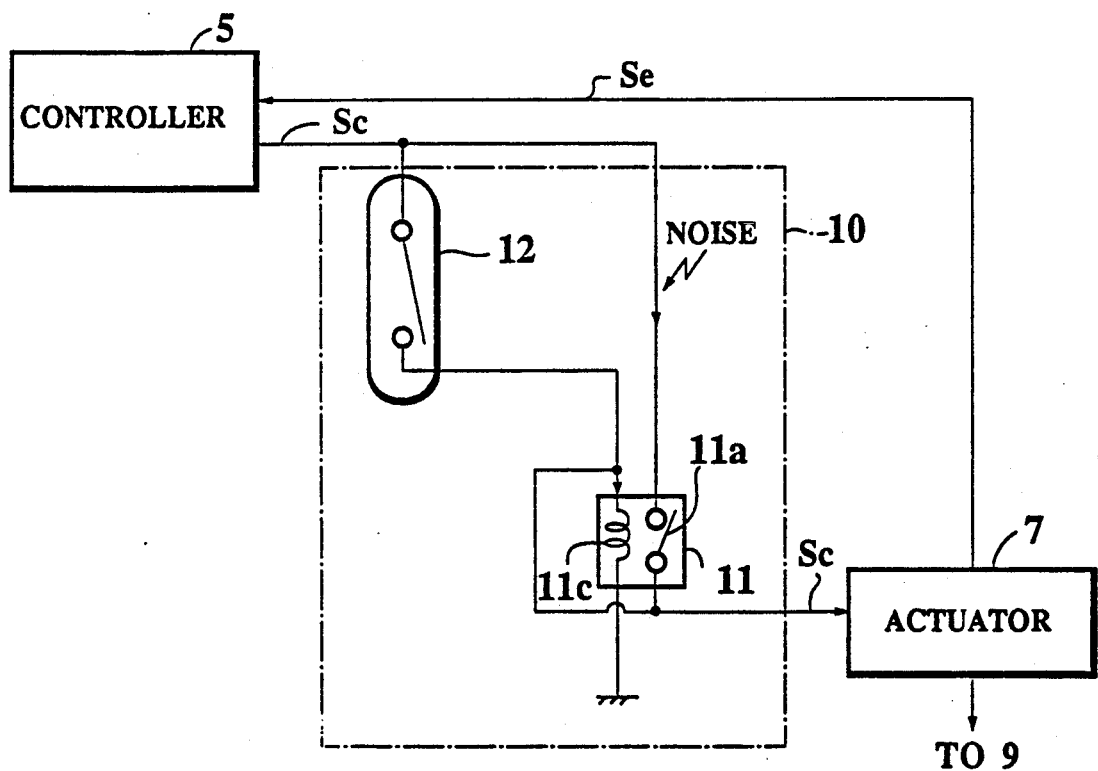
FIG. 7 is a schematic block diagram similar to FIG. 3, for assistance in explaining the prevention of erroneous operation in the control apparatus when external noise is superposed upon the actuator control signal.

Under the conditions where the shift lever 1 is not being operated as shown in FIG. 7, in case external electromagnetic noise is superposed upon a control signal line between the controller 5 and the hold relay 11, since the shift operation detecting switch 12 is kept opened, the hold relay 11 is deenergized and therefore the hold relay contact 11a is also kept opened, so that the transmission actuator 7 will not be erroneously actuated in response to external noise, thus securely preventing the transmission from being actuated erroneously when the shift lever is not being operated.

In the above embodiment, the shift operation detecting switch 12 is composed of a pair of touch switches provided on both sides of the shift lever knob 1A. Without being limited, however, it is possible to mount a single touch switch all over or a part of the spherical surface of the shift lever knob. Alternatively, it is also possible to provide this shift operation detecting switch at other positions (e.g. shift lever rod) so as to be closed only when the shift lever is being moved or operated.

As described above, in the transmission control apparatus according to the present invention, since the transmission actuating control signal can be applied from the controller to the transmission actuator only when the shift lever is being operated, it is possible to prevent the transmission from being actuated erroneously due to external noise generated through the control signal line between the controller and the transmission actuator.

What is claimed is:
1. A transmission control apparatus for an automotive vehicle provided with a transmission, comprising:
   (a) shift lever means having a shift operation detecting switch, for selecting any one of transmission gear change positions;
   (b) position detecting means associated with said shift lever means, for detecting a transmission gear change position selected by said shift lever means and generating a shift lever position signal corresponding to the detected gear change position;
   (c) control means responsive to said position detecting means, for generating a transmission actuating control signal on the basis of the generated shift lever position signal;
   (d) transmission actuating means responsive to said control means, for actuating the transmission ion the basis of the generated transmission actuating control signal; and
   (e) shift operation detecting means connected between said control means and said transmission actuating means and responsive to the shift operation detecting switch of said shift lever means, for applying the transmission actuating control signal generated by said control means to said transmission actuating means to actuate the transmission only when said shift lever means is being operated.
2. The transmission control apparatus of claim 1, wherein said shift operation detecting means comprises:
   (a) an operating switch mounted on said shift lever means so as to be closed only when said shift lever means is being operated, said operating switch being connected to said control means; and
   (b) a hold relay having relay coil means connected to said control means via said operation switch and relay contact means connected between said control means and said transmission actuating means, said relay contact means being closed to apply the transmission actuating control signal to said transmission actuating means, when said relay coil means is energized by the same transmission actuating control signal applied through said operation switch.

3. The transmission control apparatus of claim 2, wherein said relay contact means is kept closed by energizing the relay coil means by the transmission actuating control signal passed through said relay contact means itself, even after said operation switch has been opened, said relay contact means being opened when said control means stops outputting the transmission actuating control signal to said transmission actuating means in response to an end signal indicative of gear shift operation completion and outputted from said transmission actuating means to said control means after the transmission has been actuated in response to the transmission actuating control signal.

4. The transmission control apparatus of claim 2, wherein said operation switch is at least one touch switch provided on a shift lever knob of said shift lever means.

* * * * *